(12) United States Patent
Tidemann et al.

(10) Patent No.: US 11,283,717 B2
(45) Date of Patent: Mar. 22, 2022

(54) DISTRIBUTED FAULT TOLERANT SERVICE CHAIN

(71) Applicant: VMware, Inc., Palo Alto, CA (US)

(72) Inventors: Jeremy Tidemann, Urbana, IL (US); Constantine Polychronopoulos, Saratoga, CA (US); Marc-Andre Bordeleau, Shawinigan (CA); Edward Choh, Richmond (CA); Ojas Gupta, Mountain View, CA (US); Robert Kidd, Champaign, IL (US); Raja Kommula, Cupertino, CA (US); Georgios Oikonomou, Patras (GR); Mingjie Zhao, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 36 days.

(21) Appl. No.: 16/668,505

(22) Filed: Oct. 30, 2019

(65) Prior Publication Data
US 2021/0135992 A1    May 6, 2021

(51) Int. Cl.
*H04L 12/743* (2013.01)
*H04L 45/7453* (2022.01)
(Continued)

(52) U.S. Cl.
CPC ........ *H04L 45/7453* (2013.01); *H04L 9/0643* (2013.01); *H04L 45/021* (2013.01); *H04L 45/22* (2013.01); *H04L 45/28* (2013.01)

(58) Field of Classification Search
None
See application file for complete search history.

(56) References Cited

U.S. PATENT DOCUMENTS

| 6,006,264 A | 12/1999 | Colby et al. |
| 6,104,700 A | 8/2000 | Haddock et al. |

(Continued)

FOREIGN PATENT DOCUMENTS

| CN | 1689369 A | 10/2005 |
| CN | 101594358 A | 12/2009 |

(Continued)

OTHER PUBLICATIONS

Non-Published Commonly Owned U.S. Appl. No. 16/816,067 (N153.01.C1), filed Mar. 11, 2020, 55 pages, Nicira, Inc.

(Continued)

*Primary Examiner* — Otis L Thompson, Jr.
(74) *Attorney, Agent, or Firm* — Adeli LLP

(57) ABSTRACT

Some embodiments of the invention provide novel methods for performing services on data messages passing through a network connecting one or more datacenters, such as software defined datacenters (SDDCs). The method of some embodiments uses service containers executing on host computers to perform different chains (e.g., ordered sequences) of services on different data message flows. For a data message of a particular data message flow that is received or generated at a host computer, the method in some embodiments uses a service classifier executing on the host computer to identify a service chain that specifies several services to perform on the data message. For each service in the identified service chain, the service classifier identifies a service container for performing the service. The service classifier then forwards the data message to a service forwarding element to forward the data message through the service containers identified for the identified service chain. The service classifier and service forwarding element are implemented in some embodiments as processes that are defined as hooks in the virtual interface endpoints (e.g., (Continued)

virtual Ethernet ports) of the host computer's operating system (e.g., Linux operating system) over which the service containers execute.

20 Claims, 10 Drawing Sheets

(51) Int. Cl.
*H04L 45/28* (2022.01)
*H04L 9/06* (2006.01)
*H04L 45/00* (2022.01)
*H04L 45/021* (2022.01)

(56) References Cited

U.S. PATENT DOCUMENTS

| | | |
|---|---|---|
| 6,154,448 A | 11/2000 | Petersen et al. |
| 6,772,211 B2 | 8/2004 | Lu et al. |
| 6,779,030 B1 | 8/2004 | Dugan et al. |
| 6,826,694 B1 | 11/2004 | Dutta et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,649,890 B2 | 1/2010 | Mizutani et al. |
| 7,698,458 B1 | 4/2010 | Liu et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,224,885 B1 | 7/2012 | Doucette et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,913,611 B2 | 12/2014 | Koponen et al. |
| 8,914,406 B1 | 12/2014 | Haugsnes et al. |
| 8,966,024 B2 | 2/2015 | Koponen et al. |
| 8,966,029 B2 | 2/2015 | Zhang et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,009,289 B1 | 4/2015 | Jacob |
| 9,015,823 B1 | 4/2015 | Koponen et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,172,603 B2 | 10/2015 | Padmanabhan et al. |
| 9,178,709 B2 | 11/2015 | Higashida et al. |
| 9,191,293 B2 | 11/2015 | Iovene et al. |
| 9,195,491 B2 | 11/2015 | Zhang et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,258,742 B1 * | 2/2016 | Pianigiani ............ H04L 45/38 |
| 9,264,313 B1 | 2/2016 | Manuguri et al. |
| 9,277,412 B2 | 3/2016 | Freda et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,042,722 B1 | 8/2018 | Chigurupati et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,089,127 B2 | 10/2018 | Padmanabhan et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,158,573 B1 | 12/2018 | Lee et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,514,941 B2 | 12/2019 | Zhang et al. |
| 10,516,568 B2 | 12/2019 | Jain et al. |
| 10,547,692 B2 | 1/2020 | Salgueiro et al. |
| 10,594,743 B2 | 3/2020 | Hong et al. |
| 10,609,091 B2 | 3/2020 | Hong et al. |
| 10,623,309 B1 * | 4/2020 | Gampel ............ H04L 67/1002 |
| 10,637,750 B1 | 4/2020 | Bollineni et al. |
| 10,645,060 B2 | 5/2020 | Ao et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,728,174 B2 | 7/2020 | Boutros et al. |
| 10,742,544 B2 | 8/2020 | Roeland et al. |

(56) References Cited

U.S. PATENT DOCUMENTS

| | | |
|---|---|---|
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,805,181 B2 | 10/2020 | Boutros et al. |
| 10,805,192 B2 | 10/2020 | Boutros et al. |
| 10,812,378 B2 | 10/2020 | Nainar et al. |
| 10,834,004 B2 | 11/2020 | Yigit et al. |
| 10,853,111 B1 | 12/2020 | Gupta et al. |
| 10,929,171 B2 | 2/2021 | Gokhale et al. |
| 10,938,716 B1 | 3/2021 | Chin et al. |
| 10,944,673 B2 | 3/2021 | Naveen et al. |
| 10,949,244 B2 | 3/2021 | Naveen et al. |
| 11,003,482 B2 | 5/2021 | Rolando et al. |
| 11,012,420 B2 | 5/2021 | Sevinc et al. |
| 11,036,538 B2 | 6/2021 | Lecuyer et al. |
| 11,038,782 B2 | 6/2021 | Boutros et al. |
| 11,042,397 B2 | 6/2021 | Mishra et al. |
| 11,074,097 B2 | 7/2021 | Naveen et al. |
| 11,075,839 B2 | 7/2021 | Zhuang et al. |
| 11,075,842 B2 | 7/2021 | Jain et al. |
| 11,086,654 B2 | 8/2021 | Rolando et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0037713 A1 | 2/2009 | Khalid et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |

(56) References Cited

U.S. PATENT DOCUMENTS

| | | |
|---|---|---|
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0291088 A1 | 10/2013 | Shieh et al. |
| 2013/0297798 A1 | 11/2013 | Arisoylu et al. |
| 2013/0301472 A1 | 11/2013 | Allan |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0336319 A1 | 12/2013 | Liu et al. |
| 2013/0343174 A1 | 12/2013 | Guichard et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0029447 A1 | 1/2014 | Schrum, Jr. |
| 2014/0046997 A1 | 2/2014 | Dain et al. |
| 2014/0046998 A1 | 2/2014 | Dain et al. |
| 2014/0050223 A1 | 2/2014 | Foo et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092906 A1 | 4/2014 | Kandaswamy et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0115578 A1 | 4/2014 | Cooper et al. |
| 2014/0129715 A1 | 5/2014 | Mortazavi |
| 2014/0149696 A1 | 5/2014 | Frenkel et al. |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0254591 A1 | 9/2014 | Mahadevan et al. |
| 2014/0269487 A1 | 9/2014 | Kalkunte |
| 2014/0269717 A1 | 9/2014 | Thubert et al. |
| 2014/0269724 A1 | 9/2014 | Mehler et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0334488 A1 | 11/2014 | Guichard et al. |
| 2014/0341029 A1 | 11/2014 | Allan et al. |
| 2014/0351452 A1 | 11/2014 | Bosch et al. |
| 2014/0362682 A1 | 12/2014 | Guichard et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1* | 1/2015 | Guichard ............... H04L 45/30 709/242 |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0073967 A1 | 3/2015 | Katsuyama et al. |
| 2015/0078384 A1 | 3/2015 | Jackson et al. |
| 2015/0092564 A1 | 4/2015 | Aldrin |
| 2015/0103645 A1 | 4/2015 | Shen et al. |
| 2015/0103679 A1 | 4/2015 | Tessmer et al. |
| 2015/0103827 A1* | 4/2015 | Quinn ..................... H04L 49/70 370/392 |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0236948 A1 | 8/2015 | Dunbar et al. |
| 2015/0237013 A1 | 8/2015 | Bansal et al. |
| 2015/0242197 A1 | 8/2015 | Alfonso et al. |
| 2015/0263901 A1 | 9/2015 | Kumar et al. |
| 2015/0263946 A1 | 9/2015 | Tubaltsev et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0319078 A1 | 11/2015 | Lee et al. |
| 2015/0358235 A1 | 12/2015 | Zhang et al. |
| 2015/0365322 A1 | 12/2015 | Shatzkamer et al. |
| 2015/0370586 A1 | 12/2015 | Cooper et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0057687 A1 | 2/2016 | Horn et al. |
| 2016/0065503 A1 | 3/2016 | Yohe et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |

(56) References Cited

U.S. PATENT DOCUMENTS

| | | |
|---|---|---|
| 2016/0094661 A1 | 3/2016 | Jain et al. |
| 2016/0105333 A1 | 4/2016 | Lenglet et al. |
| 2016/0119226 A1 | 4/2016 | Guichard et al. |
| 2016/0127306 A1 | 5/2016 | Wang et al. |
| 2016/0127564 A1 | 5/2016 | Sharma et al. |
| 2016/0134528 A1 | 5/2016 | Lin et al. |
| 2016/0149816 A1 | 5/2016 | Roach et al. |
| 2016/0149828 A1 | 5/2016 | Vijayan et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197839 A1 | 7/2016 | Li et al. |
| 2016/0205015 A1 | 7/2016 | Halligan et al. |
| 2016/0212048 A1 | 7/2016 | Kaempfer et al. |
| 2016/0212237 A1 | 7/2016 | Nishijima |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0344565 A1 | 11/2016 | Batz et al. |
| 2016/0344621 A1 | 11/2016 | Roeland et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019329 A1 | 1/2017 | Kozat et al. |
| 2017/0019341 A1 | 1/2017 | Huang et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064048 A1 | 3/2017 | Pettit et al. |
| 2017/0064749 A1 | 3/2017 | Jain et al. |
| 2017/0078176 A1 | 3/2017 | Lakshmikantha et al. |
| 2017/0078961 A1 | 3/2017 | Rabii et al. |
| 2017/0093698 A1 | 3/2017 | Farmanbar |
| 2017/0099194 A1 | 4/2017 | Wei |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0149680 A1 | 5/2017 | Liu et al. |
| 2017/0163531 A1 | 6/2017 | Kumar et al. |
| 2017/0163724 A1 | 6/2017 | Puri et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250902 A1 | 8/2017 | Rasanen et al. |
| 2017/0250917 A1 | 8/2017 | Ruckstuhl et al. |
| 2017/0251065 A1 | 8/2017 | Furr et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317887 A1 | 11/2017 | Dwaraki et al. |
| 2017/0317926 A1 | 11/2017 | Penno et al. |
| 2017/0317936 A1 | 11/2017 | Swaminathan et al. |
| 2017/0317954 A1 | 11/2017 | Masurekar et al. |
| 2017/0318097 A1 | 11/2017 | Drew et al. |
| 2017/0324651 A1 | 11/2017 | Penno et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1* | 12/2017 | Kwak .................. H04L 45/38 |
| 2017/0364794 A1 | 12/2017 | Mahkonen et al. |
| 2017/0366605 A1 | 12/2017 | Chang et al. |
| 2017/0373990 A1 | 12/2017 | Jeuk et al. |
| 2018/0006935 A1 | 1/2018 | Mutnuru et al. |
| 2018/0026911 A1 | 1/2018 | Anholt et al. |
| 2018/0027101 A1* | 1/2018 | Kumar .................. H04L 45/302 |
| | | 370/392 |
| 2018/0041524 A1 | 2/2018 | Reddy et al. |
| 2018/0063018 A1 | 3/2018 | Bosch et al. |
| 2018/0091420 A1 | 3/2018 | Drake et al. |
| 2018/0102919 A1 | 4/2018 | Hao et al. |
| 2018/0102965 A1 | 4/2018 | Hari et al. |
| 2018/0115471 A1 | 4/2018 | Curcio et al. |
| 2018/0123950 A1 | 5/2018 | Garg et al. |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159801 A1 | 6/2018 | Rajan et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1 | 6/2018 | Gunda |
| 2018/0184281 A1 | 6/2018 | Tamagawa et al. |
| 2018/0191600 A1 | 7/2018 | Hecker et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0205637 A1 | 7/2018 | Li |
| 2018/0213040 A1 | 7/2018 | Pak et al. |
| 2018/0219762 A1* | 8/2018 | Wang .................. H04L 67/2809 |
| 2018/0227216 A1 | 8/2018 | Hughes |
| 2018/0234360 A1 | 8/2018 | Narayana et al. |
| 2018/0248713 A1 | 8/2018 | Zanier et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0295053 A1* | 10/2018 | Leung .................. H04L 67/2861 |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028384 A1* | 1/2019 | Penno .................. H04L 45/306 |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0124096 A1 | 4/2019 | Ahuja et al. |
| 2019/0132220 A1 | 5/2019 | Boutros et al. |
| 2019/0132221 A1 | 5/2019 | Boutros et al. |
| 2019/0140863 A1 | 5/2019 | Nainar et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0173850 A1 | 6/2019 | Jain et al. |

(56) References Cited

U.S. PATENT DOCUMENTS

| | | |
|---|---|---|
| 2019/0173851 A1 | 6/2019 | Jain et al. |
| 2019/0229937 A1 | 7/2019 | Nagarajan et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0268384 A1 | 8/2019 | Hu et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0059761 A1 | 2/2020 | Li et al. |
| 2020/0067828 A1 | 2/2020 | Liu et al. |
| 2020/0076684 A1 | 3/2020 | Naveen et al. |
| 2020/0076734 A1 | 3/2020 | Naveen et al. |
| 2020/0084141 A1* | 3/2020 | Bengough ............. H04L 47/125 |
| 2020/0136960 A1* | 4/2020 | Jeuk ........................ H04L 69/22 |
| 2020/0145331 A1 | 5/2020 | Bhandari et al. |
| 2020/0162318 A1 | 5/2020 | Patil et al. |
| 2020/0195711 A1 | 6/2020 | Abhigyan et al. |
| 2020/0204492 A1 | 6/2020 | Sarva et al. |
| 2020/0213366 A1 | 7/2020 | Hong et al. |
| 2020/0220805 A1 | 7/2020 | Dhanabalan |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0322271 A1 | 10/2020 | Jain et al. |
| 2020/0344088 A1 | 10/2020 | Selvaraj et al. |
| 2020/0358696 A1 | 11/2020 | Hu et al. |
| 2020/0366526 A1 | 11/2020 | Boutros et al. |
| 2020/0366584 A1 | 11/2020 | Boutros et al. |
| 2020/0382412 A1 | 12/2020 | Chandrappa et al. |
| 2020/0382420 A1 | 12/2020 | Suryanarayana et al. |
| 2020/0389401 A1 | 12/2020 | Enguehard et al. |
| 2021/0029088 A1 | 1/2021 | Mayya et al. |
| 2021/0044502 A1 | 2/2021 | Boutros et al. |
| 2021/0120080 A1 | 4/2021 | Mishra et al. |
| 2021/0136140 A1 | 5/2021 | Tidemann et al. |
| 2021/0136141 A1 | 5/2021 | Tidemann et al. |
| 2021/0218587 A1 | 7/2021 | Mishra et al. |
| 2021/0227041 A1 | 7/2021 | Sawant et al. |
| 2021/0227042 A1 | 7/2021 | Sawant et al. |

FOREIGN PATENT DOCUMENTS

| | | |
|---|---|---|
| CN | 101729412 A | 6/2010 |
| CN | 103516807 A | 1/2014 |
| CN | 103795805 A | 5/2014 |
| CN | 104471899 A | 3/2015 |
| CN | 104521195 A | 4/2015 |
| CN | 107078950 A | 8/2017 |
| CN | 107204941 A | 9/2017 |
| EP | 2426956 A1 | 3/2012 |
| EP | 2466985 A1 | 6/2012 |
| EP | 3210345 A1 | 8/2017 |
| EP | 3300319 A1 | 3/2018 |
| JP | 2005311863 A | 11/2005 |
| WO | 9918534 A2 | 4/1999 |
| WO | 2008095010 A1 | 8/2008 |
| WO | 2014069978 A1 | 5/2014 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2020046686 A1 | 3/2020 |
| WO | 2020171937 A1 | 8/2020 |
| WO | 2021086462 A1 | 5/2021 |

OTHER PUBLICATIONS

Non-Published Commonly Owned U.S. Appl. No. 17/067,635, filed Oct. 9, 2020, 65 pages, Nicira, Inc.
Siasi, N., et al., "Container-Based Service Function Chain Mapping," 2019 SoutheastCon, Apr. 11-14, 2019, 6 pages, IEEE, Huntsville, AL, USA.
Author Unknown, "Datagram," Jun. 22, 2012, 2 pages, retrieved from https://web.archive.org/web/20120622031055/https://en.wikipedia.org/wiki/datagram.
Author Unknown, "AppLogic Features," Jul. 2007, 2 pages. 3TERA, Inc.
Author Unknown, "Enabling Service Chaining on Cisco Nexus 1000V Series," Month Unknown, 2012, 25 pages, CISCO.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Greenberg, Albert, et al., "VL2: A Scalable and Flexible Data Center Network," SIGCOMM '09, Aug. 17-21, 2009, 12 pages, ACM, Barcelona, Spain.
Guichard, J., et al., "Network Service Chaining Problem Statement," Network Working Group, Jun. 13, 2013, 14 pages, Cisco Systems, Inc.
Halpern, J., et al., "Service Function Chaining (SFC) Architecture," draft-ietf-sfc-architecture-02, Sep. 20, 2014, 26 pages, IETF.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Kumar, S., et al., "Service Function Chaining Use Cases in Data Centers," draft-ietf-sfc-dc-use-cases-01, Jul. 21, 2014, 23 pages, IETF.
Liu, W., et al., "Service Function Chaining (SFC) Use Cases," draft-liu-sfc-use-cases-02, Feb. 13, 2014, 17 pages, IETF.
Non-Published Commonly Owned U.S. Appl. No. 16/120,281, filed Sep. 2, 2018, 45 pages, VMware, Inc.
Non-Published Commonly Owned U.S. Appl. No. 16/120,283, filed Sep. 2, 2018, 46 pages, VMware, Inc.
Non-Published Commonly Owned U.S. Appl. No. 16/444,826, filed Jun. 18, 2019, 125 pages, VMware, Inc.
Non-Published Commonly Owned U.S. Appl. No. 16/444,845, filed Jun. 18, 2019, 124 pages, VMware, Inc.
Non-Published Commonly Owned U.S. Appl. No. 16/444,884, filed Jun. 18, 2019, 98 pages, VMware, Inc.
Non-Published Commonly Owned U.S. Appl. No. 16/444,907, filed Jun. 18, 2019, 98 pages, VMware, Inc.
Non-Published Commonly Owned U.S. Appl. No. 16/444,927, filed Jun. 18, 2019, 99 pages, VMware, Inc.
Non-Published Commonly Owned U.S. Appl. No. 16/444,935, filed Jun. 18, 2019, 98 pages, VMware, Inc.
Non-Published Commonly Owned U.S. Appl. No. 16/444,956, filed Jun. 18, 2019, 98 pages, VMware, Inc.
Non-Published Commonly Owned U.S. Appl. No. 16/444,964, filed Jun. 18, 2019, 98 pages, VMware, Inc.
Non-Published Commonly Owned U.S. Appl. No. 16/444,978, filed Jun. 18, 2019, 98 pages, VMware, Inc.
Non-Published Commonly Owned U.S. Appl. No. 16/444,989, filed Jun. 18, 2019, 98 pages, VMware, Inc.

(56) References Cited

OTHER PUBLICATIONS

Non-Published Commonly Owned U.S. Appl. No. 16/445,004, filed Jun. 18, 2019, 98 pages, VMware, Inc.
Non-Published Commonly Owned U.S. Appl. No. 16/445,016, filed Jun. 18, 2019, 99 pages, VMware, Inc.
Non-Published Commonly Owned U.S. Appl. No. 16/445,023, filed Jun. 18, 2019, 99 pages, VMware, Inc.
Non-Published Commonly Owned U.S. Appl. No. 16/445,031, filed Jun. 18, 2019, 99 pages, VMware, Inc.
Non-Published Commonly Owned U.S. Appl. No. 16/445,035, filed Jun. 18, 2019, 98 pages, VMware, Inc.
Non-Published Commonly Owned U.S. Appl. No. 16/445,044, filed Jun. 18, 2019, 98 pages, VMware, Inc.
Non-Published Commonly Owned U.S. Appl. No. 16/445,051, filed Jun. 18, 2019, 99 pages, VMware, Inc.
Non-Published Commonly Owned U.S. Appl. No. 16/445,058, filed Jun. 18, 2019, 99 pages, VMware, Inc.
Non-Published Commonly Owned U.S. Appl. No. 16/445,062, filed Jun. 18, 2019, 98 pages, VMware, Inc.
Non-Published Commonly Owned U.S. Appl. No. 16/445,064, filed Jun. 18, 2019, 99 pages, VMware, Inc.
Non-Published Commonly Owned U.S. Appl. No. 16/668,477, filed Oct. 30, 2019, 31 pages, VMware, Inc.
Non-Published Commonly Owned U.S. Appl. No. 16/668,485, filed Oct. 30, 2019, 55 pages, VMware, Inc.
Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Casado, Martin, et al., "Virtualizing the Network Forwarding Plane," Dec. 2010, 6 pages.
Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.
Non-Published Commonly Owned U.S. Appl. No. 16/905,909, filed Jun. 18, 2020, 36 pages, Nicira, Inc.
Non-Published Commonly Owned U.S. Appl. No. 16/945,675, filed Jul. 31, 2020, 51 pages, Nicira, Inc.
Non-Published Commonly Owned U.S. Appl. No. 16/945,868, filed Aug. 1, 2020, 48 pages, Nicira, Inc.
Lin, Po-Ching, et al., "Balanced Service Chaining in Software-Defined Networks with Network Function Virtualization," Computer: Research Feature, Nov. 2016, 9 pages, vol. 49, No. 11, IEEE.
Non-Published Commonly Owned U.S. Appl. No. 17/346,255, filed Jun. 13, 2021, 49 pages, Nicira, Inc.
Non-Published Commonly Owned U.S. Appl. No. 17/352,298, filed Jun. 19, 2021, 132 pages, VMware, Inc.
Non-Published Commonly Owned U.S. Appl. No. 17/385,809, filed Jul. 26, 2021, 74 pages, Nicira, Inc.
Xiong, Gang, et al., "A Mechanism for Configurable Network Service Chaining and Its Implementation," KSII Transactions on Internet and Information Systems, Aug. 2016, 27 pages, vol. 10, No. 8, KSII.

* cited by examiner

DISTRIBUTED FAULT TOLERANT SERVICE CHAIN

Datacenters today use a static, configuration intensive way to distribute data messages between different application layers and to different service layers. A common approach today is to configure the virtual machines to send packets to virtual IP addresses, and then configure the forwarding elements and load balancers in the datacenter with forwarding rules that direct them to forward VIP addressed packets to appropriate application and/or service layers. Another problem with existing message distribution schemes is that today's load balancers often are chokepoints for the distributed traffic. Accordingly, there is a need in the art for a new approach to seamlessly distribute data messages in the datacenter between different application and/or service layers. Ideally, this new approach would allow the distribution scheme to be easily modified without reconfiguring the servers that transmit the data messages.

BRIEF SUMMARY

Some embodiments of the invention provide novel methods for performing services on data messages passing through a network connecting one or more datacenters, such as software defined datacenters (SDDCs). The method of some embodiments uses service containers executing on host computers to perform different chains (e.g., ordered sequences) of services on different data message flows. For a data message of a particular data message flow that is received or generated at a host computer, the method in some embodiments uses a service classifier executing on the host computer to identify a service chain that specifies several services to perform on the data message.

For each service in the identified service chain, the service classifier identifies a service node for performing the service. Some or all of the service nodes in a service chain are service containers in some embodiments. The service classifier then forwards the data message to a service forwarding element to forward the data message through the service nodes identified for the identified service chain. As further described below, the service classifier and service forwarding element are implemented in some embodiments as processes that are defined as hooks in the virtual interface endpoints (e.g., virtual Ethernet ports) of the host computer's operating system (e.g., Linux operating system) over which the service containers execute.

For the particular data message flow, the service classifier in some embodiments identifies a service container for at least one service in the identified service chain by performing load balancing operations to select particular service containers from a set of two or more candidate service containers for the service. In some embodiments, the service classifier performs this load balancing operation to select one service container from multiple candidate service containers for two or more (e.g., all) of the services in the identified service chain.

For a particular service, the service classifier in some embodiments performs the load balancing operation by directing a load balancer that is specified for the particular service to select a container from the set of candidate service containers for the particular service. In some embodiments, the load balancing operation uses statistics regarding data messages processed by each container in the candidate container set to select one particular container from the set for the particular data message flow.

For the particular data message flow, the service classifier in some embodiments specifies a service path identifier (SPI) that identifies a path through the containers selected for implementing the identified service chain, and provides this service path identifier to the service forwarding element to use to perform its classification operations for forwarding the data messages of this flow. In other embodiments, the service forwarding element does not use the service path identifier for forwarding the data messages of the particular data message flow, but uses MAC redirect for specifying forwarding rules for directing the data messages of this flow between successive service containers in the service path.

Conjunctively with either of these forwarding approaches, some embodiments use the specified service path identifier to select the service path for a reverse data message flow that is sent in response to the particular data message flow (e.g., by the destination of the particular data message flow). This approach ensures that in these embodiments the same set of service containers examine both the initial data message flow in the forward direction and the responsive data message flow in the reverse direction.

In some of the embodiments that use the MAC redirect approach for forwarding data messages to different service containers in the service path, the service forwarding element is implemented (1) by the virtual interface endpoints in the OS namespace that is used to define a virtual forwarding element (e.g., virtual switch or virtual bridge) in the OS, and (2) by a virtual interface endpoint in a container namespace of each service container. These virtual interface endpoints are configured to perform match-action forwarding operations needed for implementing the MAC redirect forwarding.

In some embodiments, these match-action operations include match classification operations that compare layer 2 (L2) source and/or destination network address of the data message and layer 3 (L3) source and/or destination network address of the data message with selection criteria of forwarding rules. The L3 source and/or destination network addresses are used in some embodiments to differentiate egress data messages exiting a subnet from ingress data messages entering a subnet. In some embodiments, the match-action operations include action operations that modify the L2 destination MAC address of the data messages as these embodiments use MAC redirect to forward the data messages to successive service containers.

In some embodiments, a datacenter has (1) several service host computers that execute sets of service containers for performing the same service chain on data message flows received at the datacenter, and (2) a set of one or more forwarding elements (e.g., front end load balancers) that randomly or deterministically distribute data message flows to these host computers. Each service host computer then performs a service classification operation on each data message flow that it receives to determine whether it should process the data message flow, or it should redirect the data message flow to another service host computer.

For instance, upon receiving a first data message flow, a first service host computer uses the flow's attribute set (e.g., the flow's five tuple identifier) to perform a first service classification operation that identifies a first set of services to perform on the data message. Based on an identifier for the first set of services, the first service host computer determines that a set of service machines executing on a second host has to perform the first set of services on the first data message flow. It then forwards data messages of the first data message flow to the second service host computer.

On the other hand, upon receiving a second data message flow, a first service host computer uses the flow's attribute set (e.g., flow's five tuple identifier) to perform a second service classification operation that identifies a second set of services to perform on the data message. Based on an identifier for the second set of services, the first service host computer determines that a set of service machines executing on the first service host computer has to perform the second set of services on the second data message flow. It then forwards the data message of the second data message flow to each service machine in the set of service machines on the first service host computer that has to perform a service in the second set of services on the second data message flow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel methods for performing services on data messages passing through a network connecting machines in one or more datacenters, such as software defined datacenters (SDDCs). The method of some embodiments uses service containers executing on host computers to perform different chains of services on different data message flows. Service chains include one or more service nodes, each of which performs a service in the service chain. In some embodiments, some or all of the service nodes are service containers.

Containers in some embodiments are constructs that run on top of an operating system (OS) of a host computer. In some embodiments, the host operating system uses name spaces to isolate the containers from each other and therefore provides operating-system level segregation of the different groups of applications that operate within different containers. Examples of containers include Docker containers, rkt containers, and containers executing on top of hypervisors, such as ESXi.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
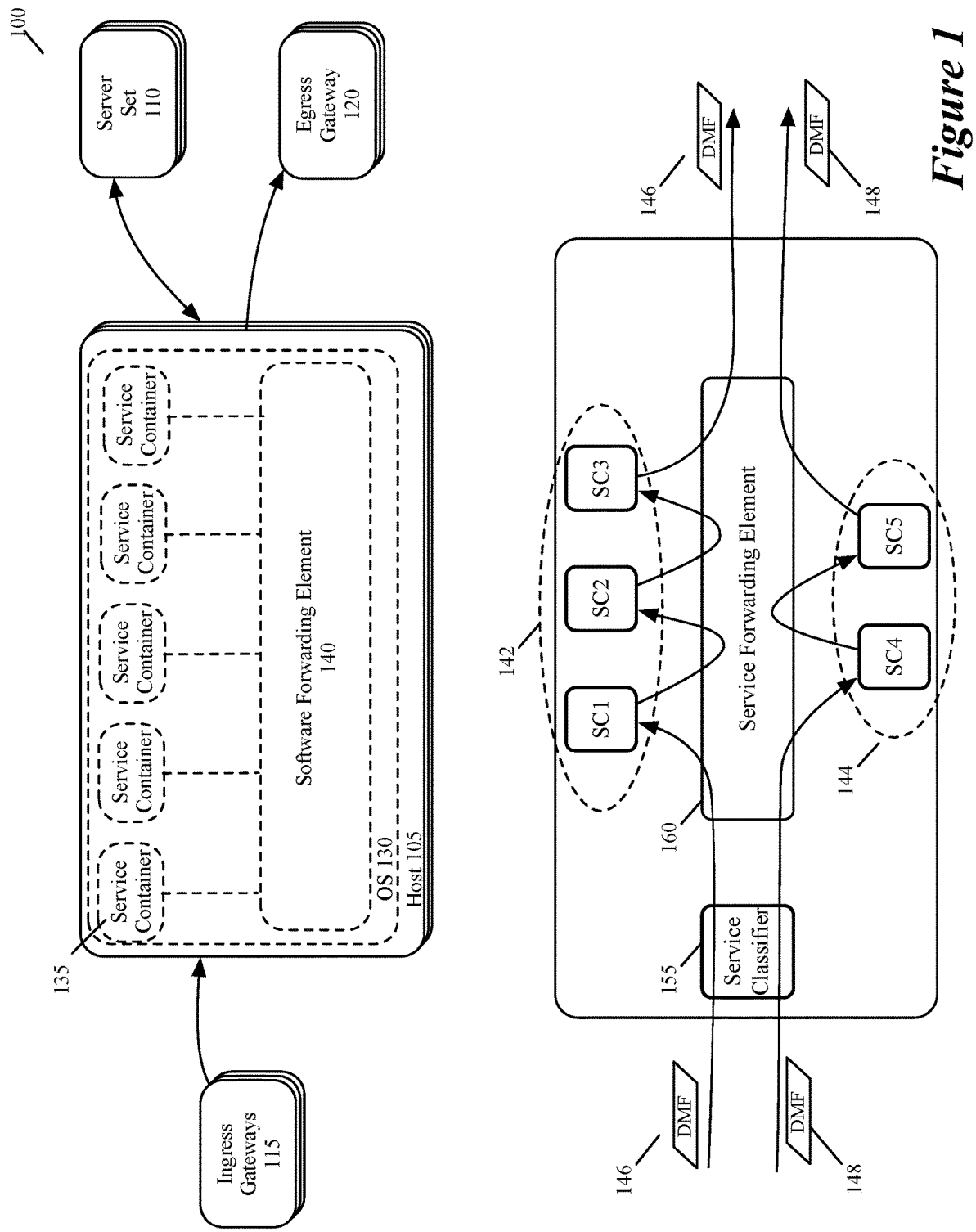
FIG. 1 illustrates a software defined datacenter (SDDC) that uses the service-performance methods of some embodiments to process data messages originating from, and/or received at, the SDDC.

FIG. 1 illustrates an SDDC 100 that uses the service-performance methods of some embodiments to process data messages originating from, and/or received at, the SDDC. In some embodiments, the SDDC is part of a telecommunication network (e.g., a 5G telecommunication network) for which multiple network slices can be defined. A data message flow can be associated with a network slice, and one or more service chains can be defined for each network slice. Each service chain in some embodiments specifies one or more ordered sequence of service operations (e.g., compute operations, forwarding operations, and/or middlebox service operations, etc.) to perform on the data message flows associated with the chain's network slice.

In a 5G telecommunication network, the service operations include virtual network functions (VNFs) that are performed on the data messages. Examples of network slices for a 5G telecommunication network include a mobile broadband slice for processing broadband data, an IoT (Internet of Things) slice for processing IoT data, a telemetry slice for processing telemetry data, a VOIP (voice over IP) slice for voice over IP data, a video conferencing slice for processing video conferencing data, a device navigation slice for processing navigation data, etc.

As shown, the SDDC 100 includes host computers 105, managing servers 110, ingress gateways 115, and egress gateways 120. The ingress/egress gateways 115 and 120 allow data messages to enter and exit the datacenter. In some embodiments, the same set of gateways can act as ingress and egress gateways, as they connect the SDDC to an external network, such as the Internet. In other embodiments, the ingress and egress gateways are different as the ingress gateways connect the SDDC to one network (e.g., a private telecommunication network) while the egress gateways connect the SDDC to another network (e.g., to the Internet). Also, in some embodiments, one or both of these sets of gateways (e.g., the ingress gateways or the egress gateways) connect to two or more networks (e.g., an MPLS network and the Internet).

As further shown, the host computers execute operating systems 130, service containers 135 and software forwarding elements 140. The operating system (OS) 130 in some embodiments is Linux. This OS executes on top of a hypervisor in some embodiments, while it executes natively (without a hypervisor) over the host computer in other embodiments. The service containers 135 and the software forwarding elements 140 are deployed and configured by the managing servers 110 to implement chains of service operations.

The managing servers 110 in some embodiments include managers through which service chains can be defined and managed, and controllers through which the service containers 135 and the software forwarding elements 140 can be configured. In other embodiments, a common set of servers performs both the management and control operations. To operate service chains, the managing servers 110 in some embodiments configure each host computer 105 and its software forwarding element to implement a service classifier 155 and a service forwarding element 160.

For a data message of a particular data message flow that is received at a host computer, the service classifier 155 executing on the host computer 105 identifies a service chain that specifies several services to perform on the data message. The received data message in some cases originate from a source machine executing on the host computer, while in other embodiments was forwarded by a forwarding element (e.g., front end load balancer) operating outside of the host computer.

For each service in the identified service chain, the service classifier 155 identifies a service container 135 to perform the service. In some embodiments, the service classifier 155 of one host computer identifies all service containers for a service chain to be on its host computer. In other embodiments, the service classifier can select service containers on different hosts to perform some or all of the service operation of the identified service chain. The set of service containers that are identified for implementing a service chain represent a service path through the network.

After identifying the service chain and the service containers to implement the service chain (e.g., after identifying the service path), the service classifier 155 passes the data message to the service forwarding element 160 to forward the data message to the service containers identified for the identified service chain. In some embodiments, the service forwarding element 160 executes on the service classifier's host computer. In other embodiments where the service containers of the identified service path can be on different host computers, the service forwarding element 160 is a distributed forwarding element (e.g., a logical forwarding element) that spans the multiple hosts that execute the service containers of the service path.

In some embodiments, the service forwarding element 160 performs L2-match operations with L2 MAC redirect action operations to forward data messages to different service containers in the service path. In other embodiments, the service forwarding element uses service path identifiers (that identify the service paths) to perform its match operations, as further described below.

FIG. 1 illustrates the service classifier 155 selecting two different service paths 142 and 144 for two different data message flows 146 and 148, and the service forwarding element 160 forwarding these data message flows along the service containers in each path. The service forwarding element forwards the data message flow 146 along service containers SC1, SC2 and SC3 for service path 142, while forwarding the data message flow 148 along the service containers SC4 and SC5 for service path 144. The service forwarding element then forwards both of these data message flows out of the SDDC 100. Once a data message is processed by the service containers of a service chain, a service forwarding element in some embodiments can also forward the data message to another host computer or another machine, application or middlebox service operating on the same host computer or different host computer in the SDDC.

Figure 2:
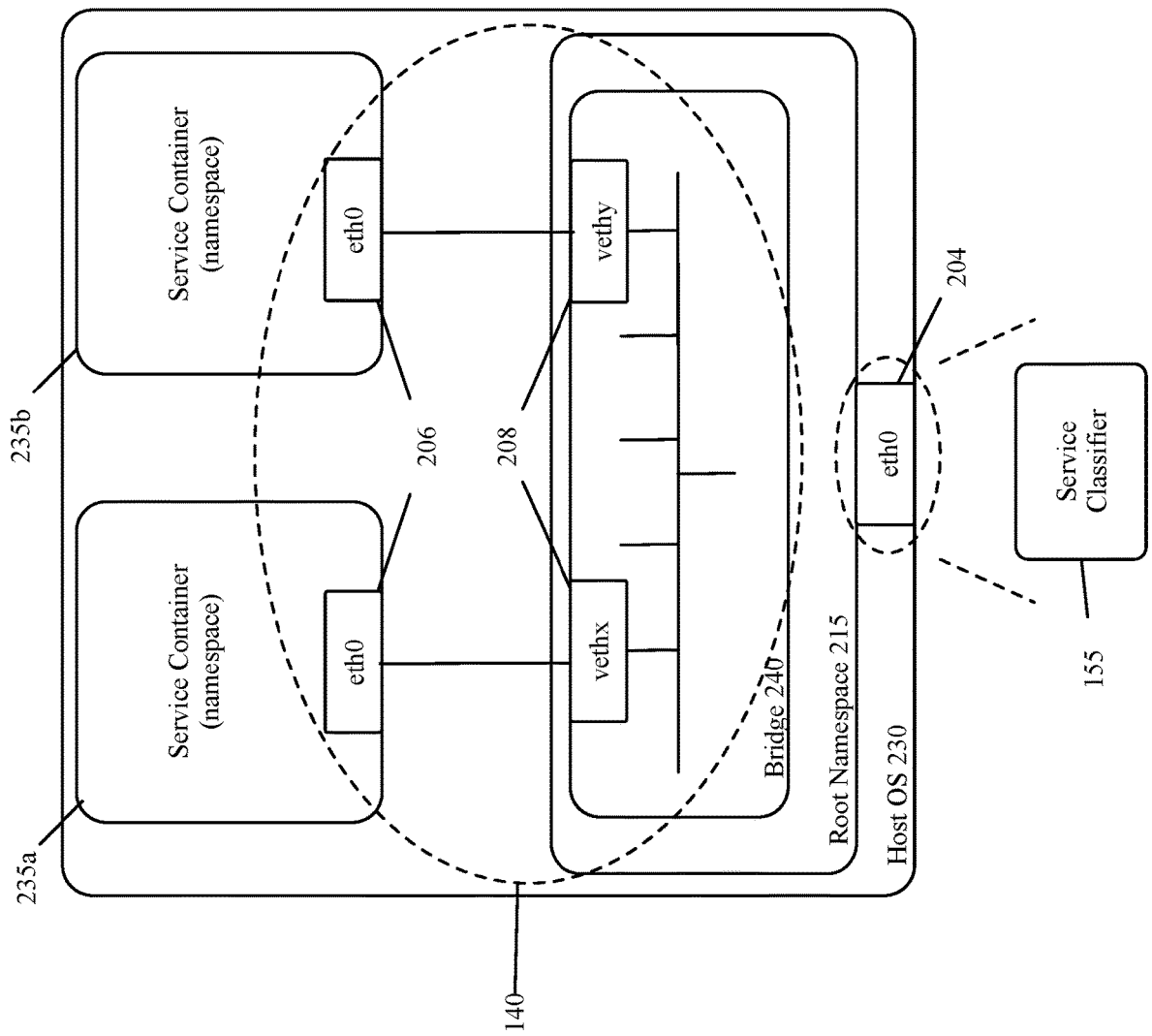
FIG. 2 illustrates how some embodiments implement the service forwarding element and the service classifier within a Linux operating system (OS) of a host computer.

FIG. 2 illustrates how some embodiments implement the service forwarding element and the service classifier within a Linux OS 230 of a host computer. As shown, a service classifier 155 in some embodiments is implemented as a hook function in an ingress-side virtual interface endpoint 204 (e.g., Ethernet port) of the Linux OS 230. This port 204 in some embodiments serves as an interface with a network interface controller (NIC) of the host computer. In some embodiments, the service forwarding element 160 is implemented in part by a Linux bridge 240 inside its root namespace 215, and in other part by hook functions in the virtual interface endpoints 206 (e.g., Ethernet ports) of the service containers 235 and in the virtual interface endpoints 208 defined in the Linux namespace.

Figure 3:
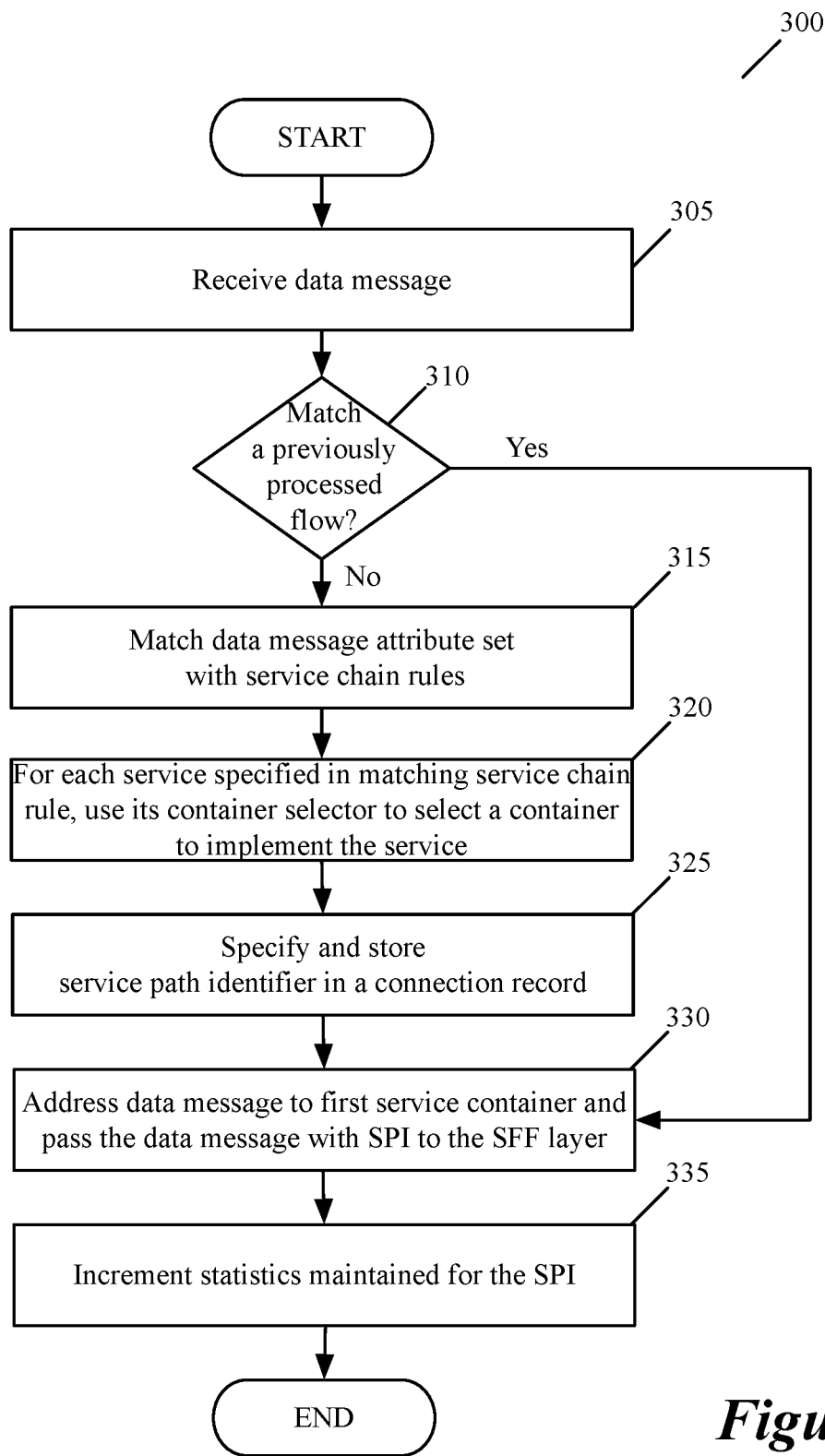
FIG. 3 illustrates a process that the service classifier performs in some embodiments.
Figure 4:
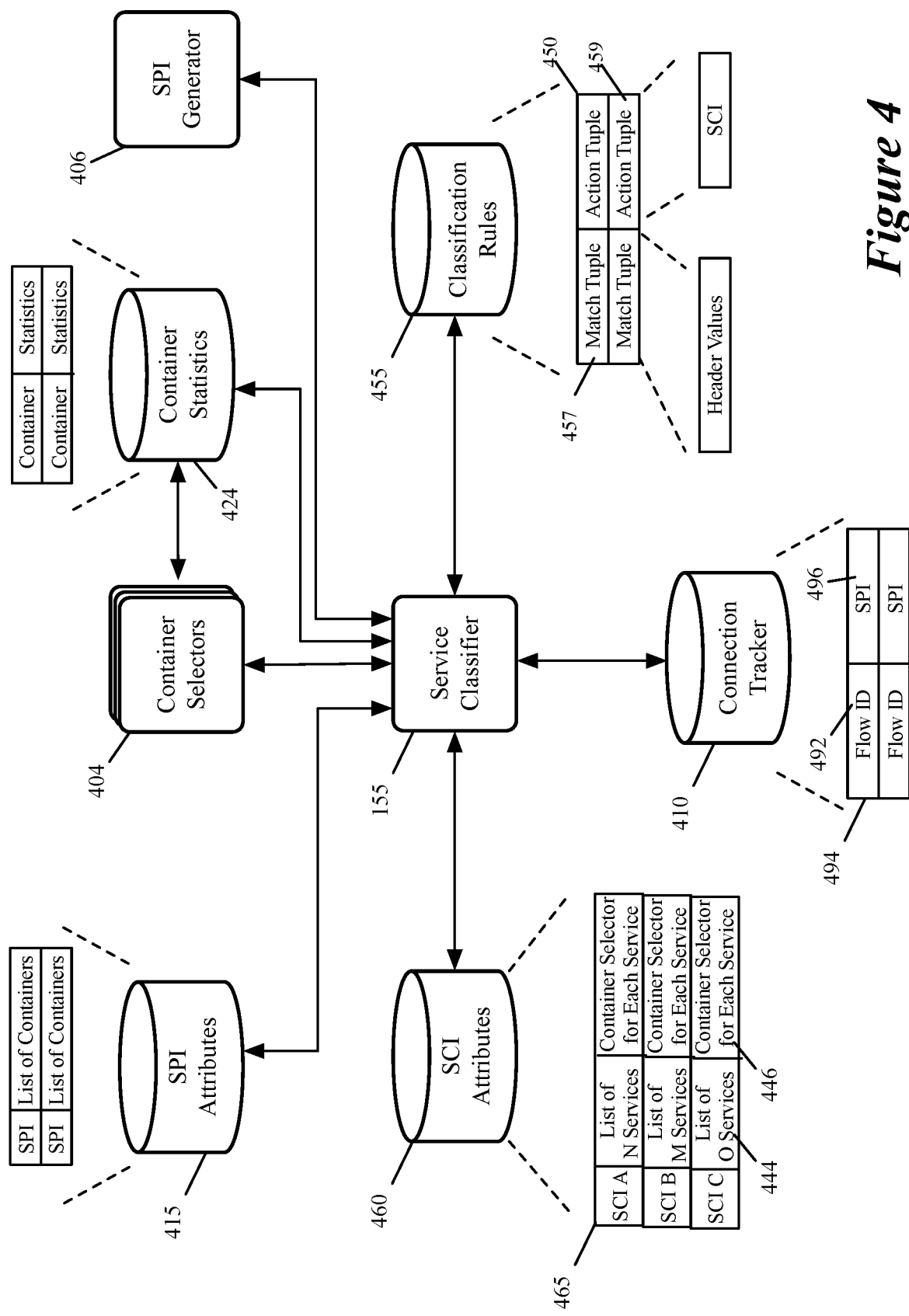
FIG. 4 illustrates the service classifier of some embodiments interacting with several other modules to perform service classification.

FIG. 3 illustrates a process 300 that the service classifier 155 performs in some embodiments. The classifier performs this process each time it receives a data message. To perform this process, the service classifier 155 interacts with several other modules executing on its host computer. As shown in FIG. 4, these other modules in some embodiments include container selectors 404 and SPI generator 406.

As shown, the process 300 starts (at 305) when the service classifier 155 receives a data message for processing. At 310, the service classifier 155 determines whether it has previously processed another data message that is in the same flow as the received data message. If so, it transitions to 330 to pass the received data message to a first service container that is identified by a record that the service classifier previously created and stored for the processed flow in a connection tracker 410, as further described below.

In some embodiments, the record that was previously created in the connection tracker might be for a related flow in the reverse direction. Specifically, in some embodiments, the record that the service classifier creates for a first data message flow in a first direction (e.g., a flow exiting the SDDC) is used by the service classifier to process a second data message flow in a second direction (e.g., a flow entering the SDDC) that is received in response to the first data message flow, as further described below.

The service classifier does this in order to use the same service path (e.g., the same set of service containers) to process the reverse second flow as it did for the initial first flow. In these embodiments, the connection tracker record is for a bi-directional flow, instead of just being for a unidirectional flow. In other embodiments, the service classifier creates two records when processing the first data message flow, one for the forward direction and the other for the reverse direction, as the connection-tracker records in the forward and reverse directions are related but not identical.

When the service classifier 155 determines (at 310) that it has not previously processed another data message in the same flow as the received data message, it uses (at 315) the received data message's attribute set (e.g., its header values) to perform a classification operation to identify a service chain identifier for a service chain that has to be performed on the data message's flow. In some embodiments, the data message's attribute set that is used for the classification match operation is the data message flow's five tuple identifier (e.g., source and destination IP, source and destination port, and protocol), or its seven tuple identifier (i.e., its five tuple identifier plus source and destination MAC addresses).

FIG. 4 shows the service classifier 155 performing its service classification operation by referring to service classification rules 450 that are stored in classification rule storage 455. As shown, each classification rule includes a match tuple 457 and an action tuple 459. The match tuple includes one or more header values (e.g., five or seven tuple identifiers), while the action tuple 459 includes a service chain identifier (SCI).

After matching a data message's attribute set with the match tuple 457 of a service classification rule 450, the service container 155 (at 320) retrieves the SCI from the matching service classification rule's action tuple 459 and uses the retrieved SCI to identify a record 465 in an SCI attribute storage 460. Each record 465 in the SCI attribute storage correlates an SCI with an ordered list of services 444 of the service chain identified by the SCI, and a list 446 of container selectors 404 for selecting the containers to perform the services in the chain.

At 320, the service classifier 155 in some embodiments selects a service container for each service specified in the identified SCI record 465 in the storage 460, by using the container selector 404 specified for the service in the identified SCI record. When multiple candidate service containers exist for performing one service, the specified container selector for that service in some embodiments performs a load balancing operation to select one particular candidate service container for the received data message's flow.

In some embodiments, such a load balancing operation uses statistics (stored in container statistics storage 424) regarding data messages processed by each candidate service container to select the particular service container. As further described below, the service classifier updates the statistics for the containers associated with a service path each time that it processes a data message. In some embodiments, the load balancing operations of the container selectors are designed to distribute the data message load evenly across the candidate service containers, or unevenly based on a weighted distribution scheme.

Also, in some embodiments, the container selectors for different services in a service chain work in conjunction to select the containers in a service path, e.g., in embodiments where selection of a first service container for a first service in the service path necessitates the selection of a second service container for a second service in the service path. Such is the case in some embodiments when one service container cannot be part of two different service paths (i.e., when two service paths cannot overlap).

Some embodiments group the containers into pods, with each pod comprising one or more service containers that are guaranteed to be co-located on the same host computer. Each pod in some embodiments is implemented by one virtual machine. In some embodiments, two or more of the service containers for a service path (e.g., all the service containers for the service path) are in the same pod, and two or more pods are candidates for implementing the same service chain. In some of these embodiments, the container selector 404 is a load-balancing pod selector that selects one pod from several pods that are candidates for implementing the service path of a service chain identified by the service classifier 155.

Next, at 325, the service classifier generates a SPI for the service path specified by the containers selected at 320, and stores the generated SPI in the connection tracker 410 for the received data message's flow identifier (e.g., its five or seven tuple identifier). To generate the SPI, the service classifier uses the SPI generator 406. In some embodiments, the SPI generator 406 uses a set of rules to define the SPI for a service path based on the identifiers associated with the containers selected at 320. For instance, the SPI is defined in some embodiments to be a concatenation of the UUID (universally unique ID) of the service path containers. In some embodiments, the UUIDs are concatenated in the order of the service containers in the service path.

The service classifier stores (at 325) the generated SPI in the connection tracker 410 for the received data message's flow identifier so that it can later use this SPI to identify the service path (in the SPI attribute storage 415) for a subsequent data message in the same flow as the currently processed data message. To do this, the service classifier would match the subsequent data message's flow ID (e.g., its five or seven tuple identifier) with the flow ID in a match tuple 492 of a record 494 in the connection tracker 410, and then retrieve the SPI specified by the action tuple 496 of the record with the matching flow ID.

As mentioned above, the service classifier in some embodiments uses the SPI record in the connection tracker 410 to process data messages of a flow that is in response to the flow of the currently processed data message. In some embodiments, the service classifier uses the same SPI record for the forward flow and reverse flow. In other embodiments, the service classifier creates separate connection tracker flows for the forward and reverse flows. Some embodiments use the same SPI for the reverse flow in order to ensure that the same set of service containers examine both the initial data message flow in the forward direction and the responsive data message flow in the reverse direction.

After storing the record(s) in the connection tracker 410, the service classifier transitions to 330. The process also transitions to 330 from 310 when it determines that it has previously processed the received data message's flow, identifies the SPI for this flow from the connection tracker and then uses this SPI to identify the service containers in the service path for the data message.

At 330, the service classifier passes the data message to the service forwarding element to forward to the first service container. In some embodiments, the service classifier provides the specified service path identifier to the service forwarding element to use to perform its classification operations for forwarding the data messages of this flow. In other embodiments, the service forwarding element does not use the service path identifier for forwarding the data messages of the particular data message flow, but rather uses a MAC redirect approach.

In some embodiments, the service classifier specifies the data message's destination MAC address as the MAC address of the first service container and provides this data message to service forwarding element to forward to the first service container. In other embodiments, the service classifier specified the data message's destination MAC as a MAC address associated with the service forwarding element, which uses the data message's source MAC address to perform its service forwarding operation, as further described below. In some of these embodiments, the service classifier specifies the source MAC address as a MAC address associated with the start of a particular service path to allow the service forwarding element to identify the first service container for the service path.

After 330, the service classifier increments statistics of the service containers in the identified service path. As mentioned above, the service classifier maintains these statistics in the statistic storage 424. Different statistics are maintained in different embodiments. Examples of such statistics include number of data messages, number of bytes in the forwarded payload bytes, etc. Hence, in some embodiments, the service classifier increments the statistics by incrementing each service container's message count by one, and/or adding the processed message's payload size to the byte count of each service container in the service path. After 330, the process 300 ends.

Figure 5:
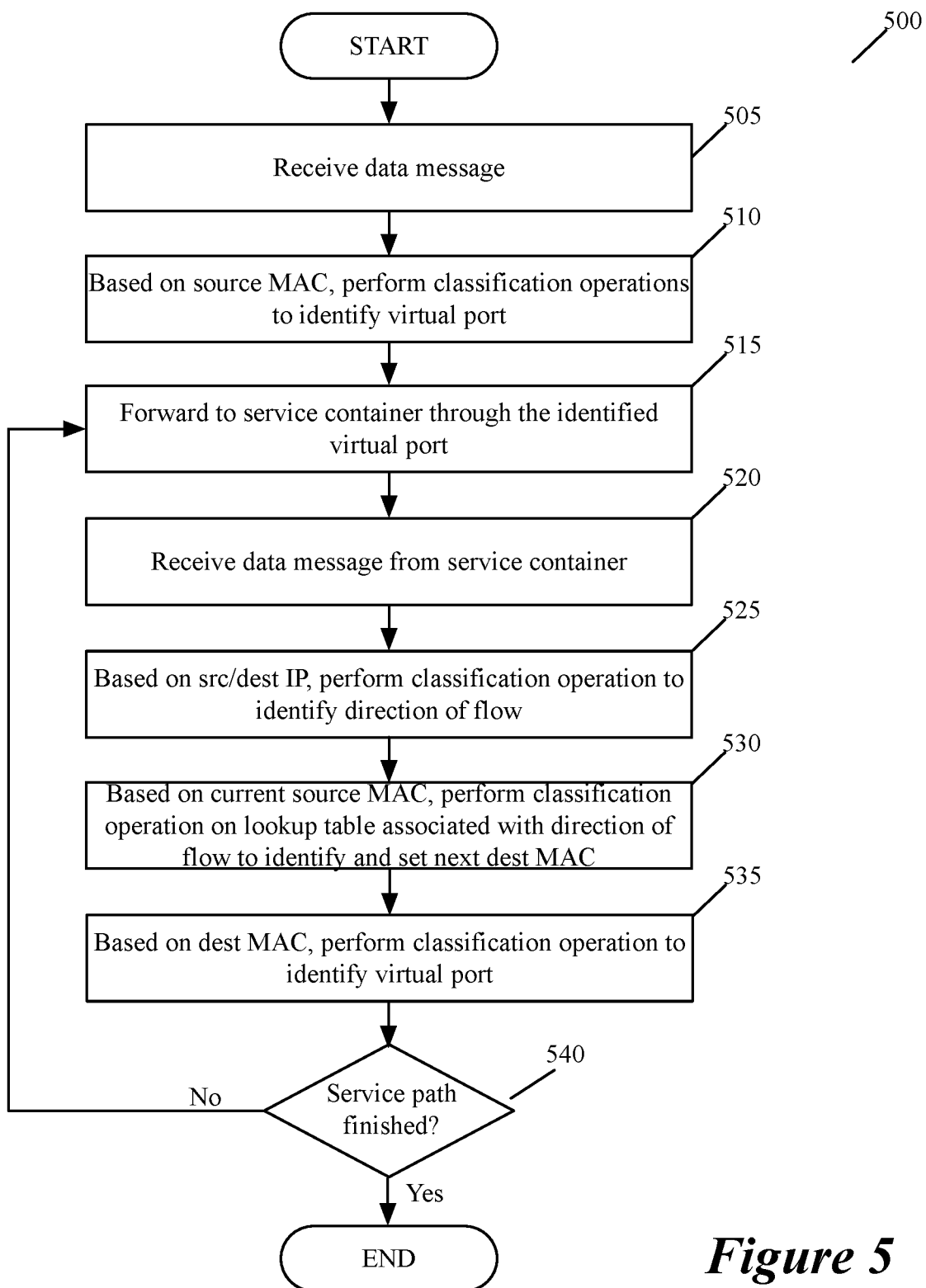
FIG. 5 presents a process that conceptually illustrates the operation of the service forwarding element in forwarding a data message through a service path identified by the service classifier.

FIG. 5 presents a process 500 that conceptually illustrates the operation of the service forwarding element 160 in forwarding a data message through a service path identified by the service classifier 155. This forwarding operation uses MAC redirect and is implemented in part by a Linux bridge 240 inside its root namespace 215, and in other part by hook functions in the virtual interface endpoints (e.g., Ethernet ports 206) of the service containers and in the virtual interface endpoints (e.g., Ethernet ports 208) defined in the Linux namespace. These virtual interface endpoints are configured to perform match-action forwarding operations needed for implementing the MAC redirect forwarding.

As shown, the process 500 starts (at 505) when it receives a data message for forwarding through the service path. Next, at 510, the process performs a classification operation to identify the virtual interface endpoint of the Linux bridge associated the first service node. As mentioned above, the service classifier in some embodiments defines this destination MAC to be the destination MAC of the virtual interface endpoint connected to the first service container. In some of these embodiments, the classification operation (at 510) compares the data message's destination MAC with the match criteria of forwarding rules in a lookup table that associates different destination MAC address with different virtual interface endpoint identifiers. Under this approach, the process retrieves the identifier for the next hop virtual interface endpoint from the forwarding rule that has the data message's destination MAC as its match criteria.

In other embodiments, the process 500 performs the classification operation differently. For instance, in some embodiments, the process 500 uses the below-described three classification operations 525-535, which first identify the direction of the service flow, then use the source MAC of the data message to identify the destination MAC of the first service node, and lastly use the identified destination MAC to identify the virtual interface endpoint. In some of these embodiments, the service classifier does not set the data message's destination MAC address to be the MAC address of the first service node, but instead sets this address to be the destination MAC address of the bridge.

Next, at 515, the process forwards the data message to the next service container through the identified virtual interface endpoint. The service container performs its service operation (e.g., middlebox service operation, etc.) on the data message, and then provides (at 520) the data message back to the service forwarding element. In some embodiments, the service container 235, its associated Ethernet port 206, or the associated bridge interface endpoint 208 changes the source MAC address of the data message to be a MAC address associated with the service container (e.g., associated with its Ethernet port 206), as the service forwarding element uses source MAC addresses to perform its next-hop service determination.

The process 500 then performs three classification operations at 525, 530 and 535, which were briefly mentioned above. The first classification operation (at 525) compares the L3 source and/or destination network addresses of the data message with classification rules that are defined to differentiate egress data messages from ingress data messages. For instance, in some embodiments, one classification rule determines whether the data message's source L3 address is in the CIDR of SDDC subnet in order to determine whether the data message is part of an upstream flow exiting the subnet, while another classification rule determines the data message's destination L3 address is in the CIDR of SDDC subnet in order to determine whether the data message is part of downstream flow entering the subnet.

In some embodiments, each of these classification rules identifies a different lookup table for performing the second classification operation at 530. Hence, after identifying the direction of the data message's flow (upstream or downstream) in the first classification operation at 525, the process 500 uses the lookup table identified by the first classification operation to perform the second lookup at 530, this time based on the current source MAC address of the data message. In some embodiments, this second classification rule matches the data message's current source MAC address with the match criteria (specified in terms of a source MAC) of one classification rule that provides in its action tuple the destination MAC of the next hop along the service path. The source MAC identifies the prior service node in the service chain for the direction identified at 525 (e.g., in the table identified at 525), and hence can be used to identify the next service node in the service chain.

In some embodiments, the second classification operation (at 530) changes the data message's destination MAC address to the MAC address of the next hop in the service path. When the service path has not been completed (i.e., when the last service container has not yet processed the data message), the next hop in the service path is another service container. On the other hand, when the service path has finished (i.e., when the last service container has processed the data message), the next hop in the service path is an egress destination MAC that has been defined for the service path. This egress destination MAC in some embodiments is a MAC address associated with a switch or router that forwards the data message to another destination in the SDDC, or is a MAC address associated with a gateway that forwards the data message out of the SDDC or an SDDC subnet.

After the destination MAC of the data message is redefined at 530, the process performs a third classification operation (at 535) to identify the virtual interface endpoint of the Linux bridge associated with the data message's destination MAC. This classification operation in some embodiments compares the data message's destination MAC with the match criteria of forwarding rules in a lookup table that associates different destination MAC address with different virtual interface endpoint identifiers. Under this approach, the process retrieves the identifier for the next hop virtual interface endpoint from the forwarding rule that has the data message's destination MAC as its match criteria.

After 535, the process 500 determines (at 540) whether the identified virtual interface endpoint identified at 535 is that of another service container. When the identified virtual interface endpoint is not another service container, the service path has been completed. The operation 540 in some embodiments is not actually performed by the service forwarding element but is included only to illustrate the end of the service path in FIG. 5.

When the identified virtual interface endpoint identified at 535 is that of another service container, the service path forwarding of the process 500 has not finished. Hence, the process returns to 515 to forward the data message to the next service container on the path through its identified virtual interface endpoint. Otherwise, the service-path forwarding process 500 ends. As mentioned above, when the service path finishes, the destination MAC address that was defined in the last iteration through 530 identifies the virtual interface endpoint of the egress port that is defined for the service path. Hence, at the end of the service path in these embodiments, the Linux bridge forwards that the data message to the virtual interface endpoint from where it will be forwarded to its next destination.

The following example by reference to the host computer of FIG. 2 further illustrates the MAC-redirect forwarding of the service forwarding element of some embodiments. In this example, the service path includes the service container 235a followed by the service container 235b for an upstream data message on which two service operations have to be performed on the data message's way out of the SDDC. When the Linux bridge 240 receives this upstream data message, the data message has a destination MAC address of the vethx interface of the bridge, as it needs to be first processed by the service container 235a.

Hence, the bridge passes the data message to the vethx interface, which in turn forwards it to the service container 235a through the eth0 interface 206 of this service container. The service container performs its service on the data message, and passes it back to vethx interface through the eth0 interface. In passing the data message back to the vethx interface, the service container or its associated eth0 interface specifies the source MAC address of the data message as the source MAC address of the eth0 interface.

The vethx interface then performs a first classification operation, which based on the data message's L3 source address being in the ingress CIDR, results in a determination that the data message is in an upstream direction. Based on this determination, the vethx interface performs a second classification operation on an upstream lookup table that matches the current source MAC address with a next hop forwarding rule that identifies the next hop's destination MAC address. After the vethx interface identifies the next hop address to be the MAC address of vethy interface, the bridge provides the data message to the vethy interface. The vethy interface forwards the data message to the service container 235b through the eth0 interface 206 of this service container. The service container performs its service on the data message, and passes it back to vethy interface through the eth0 interface. Again, the source MAC address of the data message is changed to the source MAC address of eth0 interface of the service container 235b.

The vethy interface then performs a first classification operation, which based on the data message's L3 source address being in the ingress CIDR, results in a determination that the data message is in an upstream direction. Based on this determination, vethy interface performs a second classification operation on am upstream lookup table that matches the current source MAC address with a next hop forwarding rule that identifies the next hop's destination MAC address. In this case, the next hop address is that of the egress L2 address of the bridge. Hence, after the vethy interface identifies the next hop address to be the egress MAC address of the bridge, the bridge provides the data message to its egress interface for forwarding out of the host computer.

The service forwarding element 160 uses other forwarding methods in other embodiments. For instance, in some embodiments, the service forwarding element use the SPI for the identified service path and a current hop count to perform its forwarding operations. In some embodiments, the SPI and current hop count are values that the service classifier initially creates and stores on the host computer. For each service hop, the service forwarding element compares the SPI and the current hop count with match-criteria of next hop forwarding rules, which have action tuples that provide the virtual endpoint interface identifier for the virtual interface connected to the next hop. As the service forwarding element forwards the data message through its successive service hops, it adjusts (e.g., decrements) its current hop count to correspond to the next service container position in the service path.

In some embodiments, the service forwarding element uses the SPI/hop-count approach when the service containers execute on different host computers and/or execute in different datacenters. In some such embodiments, the SPI/hop-count information is embedded in tunnel headers that encapsulate the data messages as they are forwarded between the different host computers and/or different datacenters.

As mentioned above, the SDDC 100 in some embodiments has several host computers that execute sets of service containers for performing the same service chain on data message flows received at the datacenter. In some such embodiments, the host computers only execute service containers that perform operations associated with service chains, and do not execute any other data compute end node (i.e., any other a container or virtual machine that is the source or destination machine for a data message flow). As such, these host computers will be referred to below as service host computers. In these embodiments, other host computers in the SDDC 1000 execute the machines as serve as the compute end nodes.

In some embodiments, the service classification, forwarding and operations are distributed among these service host computers to distribute the service load and to provide fault tolerance in case one or more service host computers fail. A set of one or more frontend forwarding elements (e.g., load balancers) randomly or deterministically distribute data message flows to these service host computers, which then perform service classification operation on the data message flows that they receive to determine whether they should service process the data message flows, or should redirect the data message flows to other service host computers for service processing.

Figure 6:
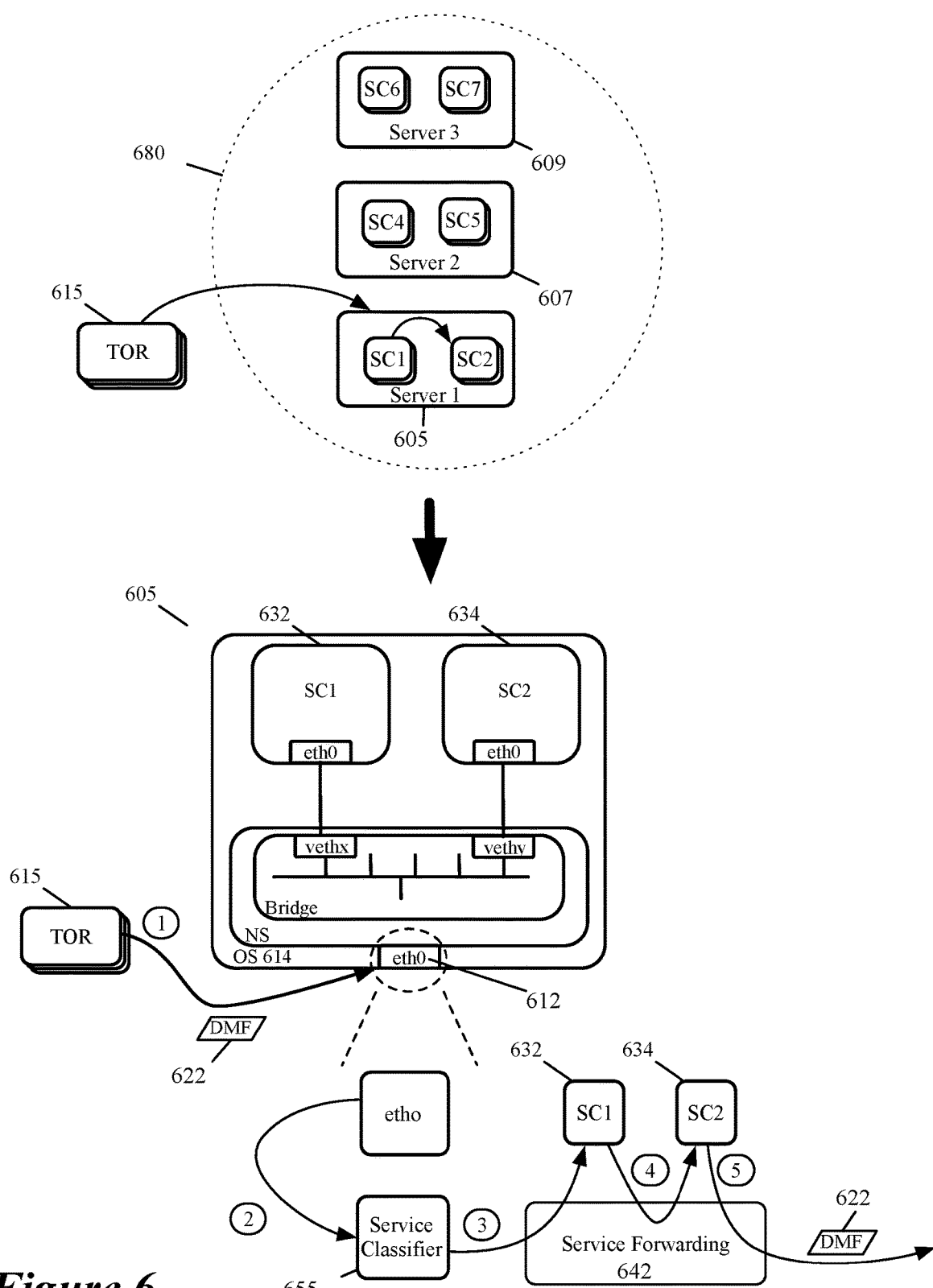
FIG. 6 illustrates that upon receiving a first data message flow, a virtual interface endpoint of the Linux OS of a first service host computer passes the data message to a service classifier that has registered as a hook in a callback mechanism of the OS.
Figure 7:
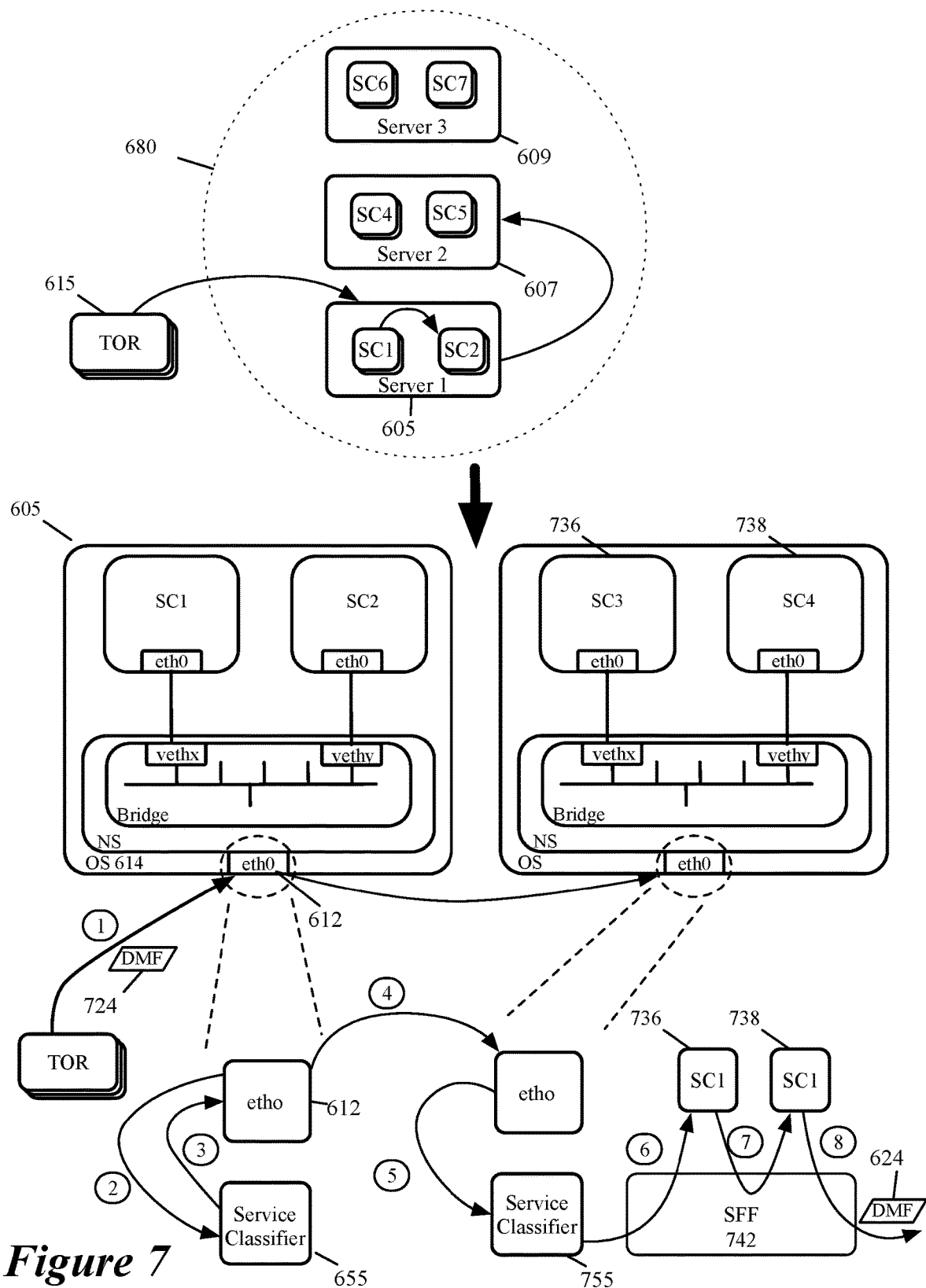
FIG. 7 illustrates the processing of the second data message flow, which a top of rack switch initially forwards to the first service host computer.

FIGS. 6 and 7 illustrate examples of three service host computers 605, 607 and 609 performing distributed service classification and forwarding operations of some embodiments. Each of these service host computers in some embodiments executes two clusters of service containers for performing two different services. Each cluster in this example includes more than one container. As further described below by reference to FIG. 9, the service classification and forwarding operations are distributed among the service host computers 605, 607 and 609, so that these computers implement the same service classification and forwarding operations (e.g., process the same service classification and forwarding rules) for similar service containers that execute on them.

In the examples of FIGS. 6 and 7, a top-of-rack (TOR) switch 615 selects the first service host computer 605 to process two different data message flows, as part of a load balancing operation that it performs to distribute the load across different host computers that execute service containers that perform service operations. This TOR is part of a cluster of two or more TORs that perform such frontend load balancing operations for a cluster 680 of three service host computers 605, 607 and 609. These frontend load balancing operations are deterministic (e.g., are based on flow-identifier hashes and hash table lookups) in some embodiments, while being random in other embodiments.

FIG. 6 illustrates that upon receiving a first data message flow 622, a virtual interface endpoint 612 of the Linux OS 614 of the first service host computer 605 passes the data message to a service classifier 655 that has registered as a hook in the XDP (eXpress Data Path) callback mechanism of this OS. The service classifier 655 of the first service host computer 605 uses the flow's attribute set (e.g., five or seven tuple identifier) to perform a first service classification operation that identifies a first service chain that specifies a set of services to perform on the data message.

Based on the first service chain's identifier, the service classifier of the first service host computer determines that service containers executing on the first host computer 605 have to perform the first service chain's set of services on the first data message flow 622. For instance, in some embodiments, the service classifier computes a hash value from the service chain identifier and then lookups this hash value in a hash lookup table that correlates hash ranges with different service host computer identifiers. Some embodiments compute the hash value based on the other parameters in conjunction or instead of the service chain identifier. Examples of such other parameters include source network address (e.g., source IP address), source port, SPI, etc.

After its hash lookup identifies the first host computer 605 as the service host computer that should process the received data message flow, the service classifier 655 of the first service host computer 605 selects the service containers 632 and 634 on the first host computer to implement the service path that performs the services in the identified service chain. The service classifier then hands off the data message flow 622 to the service forwarding element 642 executing on the first host computer 605 to sequentially forward the data messages of the first data message flow to the two identified service containers 632 and 634 on the first host computer 605 so that these service containers can perform their service operations on these data messages. After the service processing, the data messages are forwarded to their next hop destination (e.g., to the destination identified by their original layers 3 and 4 header values).

FIG. 7 illustrates the processing of the second data message flow 724, which the TOR 615 also initially forwards to the first service host computer 605. Upon receiving a data message of the second data message flow 724 at the virtual interface endpoint 612, the data message is again forwarded to the service classifier 655, as it is registered as a hook function for this interface. The service classifier 655 then uses the flow's attribute set (e.g., five or seven tuple identifier) to perform a second service classification operation that identifies a second service chain that specifies a second set of services to perform on the data message.

Based on the second service chain's identifier, the first host computer 605 determines that service containers on the second host computer 607 have to perform the second set of services on the second data message flow 724. Again, in some embodiments, the service classifier computes a hash value from the service chain identifier and/or other parameters (such as source IP address, source port address, SPI, etc.) and then lookups this hash value in a hash lookup table that correlates hash ranges with different service host computer identifiers. The hash lookup in FIG. 7 identifies the second host computer 607 as the service host computer that should process the received data message flow.

Hence, in FIG. 7, the service classifier 655 hands back the data messages of the second flow 724 to virtual interface endpoint 612 for forwarding to the second host computer 607. Once a data message of the second flow is received at this virtual interface endpoint on the second host, it is passed to the service classifier 755 executing on this host, which then performs a classification operation to identify the second service chain's identifier for this data message.

Based on the second service chain's identifier (e.g., the hash of this identifier), the service classifier 755 on the second host computer 607 determines that service containers on the second host computer 607 have to perform the second set of services on the received data message and its flow 724. The service classifier then identifies the two service containers 736 and 738 on its host that have to implement the service path that performs the services in the identified service chain. It then hands off the received data message of the second flow 724 to the service forwarding element 742 executing on the second host computer 607 to sequentially forward to each of two service containers 736 and 738 on the second host computer 607 so that these service containers can perform their service operations on these data messages. After the service processing, the data messages are forwarded to their next hop destination (e.g., to the destination identified by their original layers 3 and 4 header values).

Figure 8:
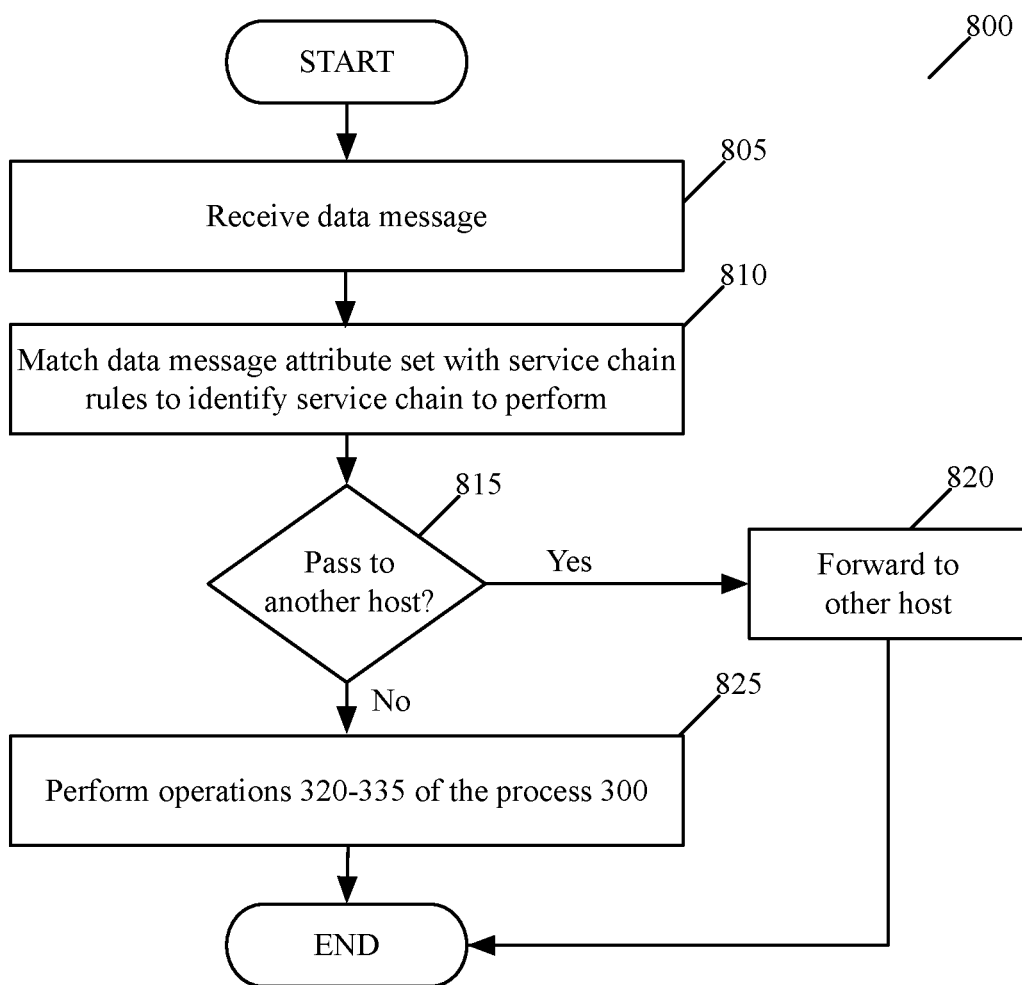
FIG. 8 illustrates a process that a service host computer performs in some embodiments, in order to perform service operations on a received data message flow, or to redirect the data message to another service host computer for service processing.

FIG. 8 illustrates a process 800 that each service host computer (e.g., computers 605, 607 and 609) performs in some embodiments, in order to perform service operations on a received data message flow, or to redirect the data message to another service host computer for service processing. As shown, the process 800 starts (at 805) when the service classifier 155 of a service host computer receives a data message for processing from the virtual interface endpoint 612 of its OS. The process then performs (at 810) a classification operation that matches the received data message's attribute set (e.g., its five or seven tuple identifier) with the match criteria of a service classification rule, and retrieves the SCI from the matching rule's action tuple.

The service classifier then uses (at 815) the retrieved SCI to determine whether service containers executing on its host computer should perform the service operations of the service chain identified by the SCI. To do this, the service classifier in some embodiments computes a hash value from the SCI and one or more other parameters (e.g., source IP address, source port, SPI, etc.) associated with the data message or the identified service chain, and then lookups this hash value in a hash lookup table that correlates hash ranges with different service host computer identifiers. In some embodiments, when a service host computer fails, the hash range associated with that service host computer is automatically assigned to one or more other service host computers, which allows the service classification and forwarding operations of the service host computers to be fault tolerant.

When the service classifier determines (at 815) that its host's service containers should perform the service operations of the identified service chain, the service classifier performs (at 825) the operations 320-335 of the process 300. On the other hand, when it determines (at 815) that another host's service containers should perform the service operations of the identified service chain, the service classifier hands back (at 820) the data message to virtual interface endpoint of its host OS for forwarding to the other host computer. After 820 and 825, the process 800 ends.

In some embodiments, the process 800 configures one or more frontend forwarding elements (e.g., frontend load balancing TORs 615) each time that it performs a classification operation for a new data message flow. Specifically, after performing its classification operation at 810, the process 800 sends an in-band or out-of-band data message (sends a message through the data path or through a control path) that associates the data message's flow identifier (e.g., five or seven tuple identifier) with the identifier of the service host computer that the process identifies (at 810) for performing the service chain on the data message's flow. A frontend forwarding element that receives such a message creates a record in its connection tracker that associates the received flow identifier with the received host identifier, and then uses this record to process subsequent data messages in the flow that it receives after it creates the record.

Figure 9:
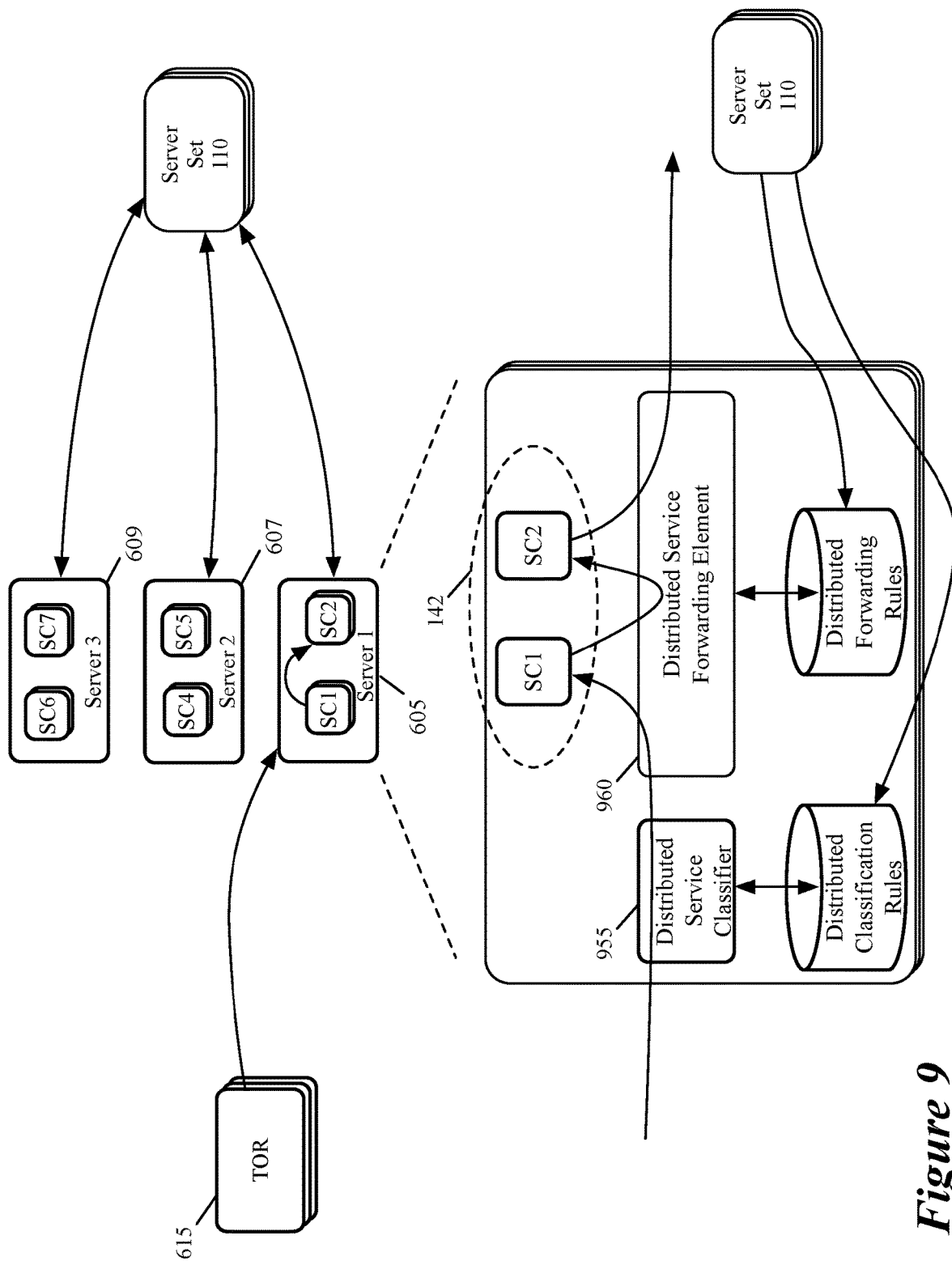
FIG. 9 further illustrates the distributed service chain classification and forwarding architecture of FIGS. 6 and 7.

FIG. 9 further illustrates the distributed service chain classification and forwarding architecture of FIGS. 6 and 7. This architecture eliminates discrete service chain classifiers and service forwarding elements in a datacenter by replacing them with distributed service classification logic and forwarding on service host computers 605, 607 and 609 that execute the service containers (e.g., the service containers that implement VNFs in a 5G telecommunication network). The service host computers are also referred to in this document as backend servers.

As shown, a server set 110 provides the same set of service classification rules and service forwarding rules to each of the service host computers 605, 607 and 609, and configures the virtual interface endpoints on these computers to use these rules. By providing the same set of service classification rules and forwarding rules to each of the service host computers, the server set configures these host computers to implement distributed service classification and forwarding operations, as depicted by the names distributed service classifier 955 and distributed forwarding element 960 in FIG. 9. These classification and forwarding operations are distributed because they are performed identically on the service host computer 605, 607 and 609, based on identical sets of classification and forwarding rules on the service host computers 605, 607 and 609.

In some embodiments, each service host computer (backend server) obtains from the server set 110 (1) service classification rules that correlate flow identifiers with service chain identifiers, (2) a list of service identifiers for each service chain identifier, (3) a list of container identifiers that identify the service containers that are candidates for implementing each service identified on the list of service identifiers, (4) the MAC address of each service container identified on the list of container identifiers, (5) a list of other service host computers for receiving redirected data message flow traffic, (6) a MAC address for each of these other service host computers, (7) a hash function for generating hash values for the received data messages, and (8) a hash lookup table that associates hash values with identifiers of service host computers.

In some embodiments, the server set 110 collects statistics generated by the service classifiers 955 on the service host computers. These statistics are pushed (published) to the server set from the service host computers in some embodiments, while they are pulled (retrieved) from the service host computers by the server set 110. The server set analyzes these statistics and based on this analysis, adds or removes service host computers from a cluster that performs one or more service chains. Also, in some embodiments, the server set deploys and configures multiple clusters of service host computers and uses different service host computer clusters for different sets of service chains. In some such embodiments, the server set can move one service chain from one service host computer cluster to another service host computer cluster.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
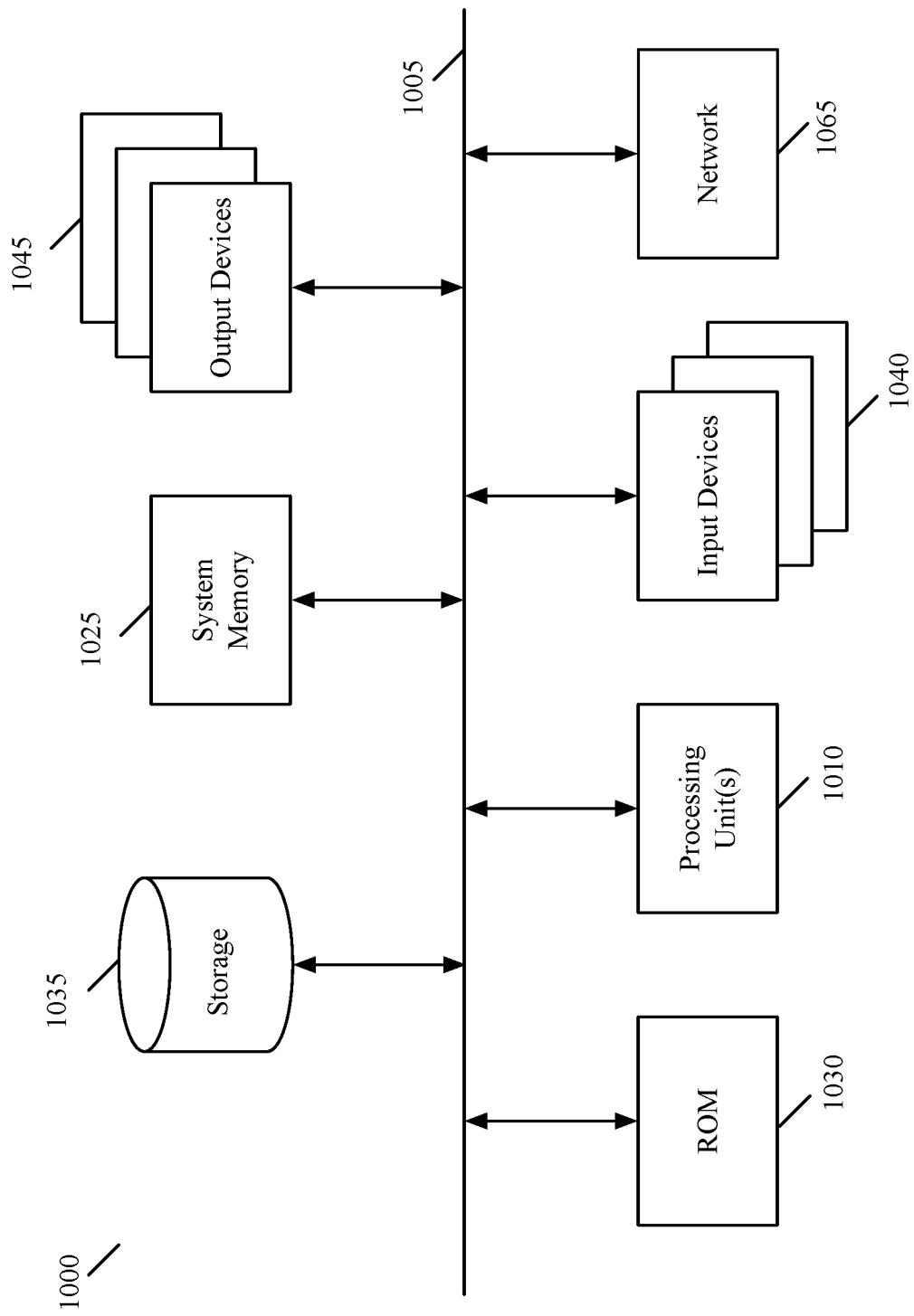
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, and managers. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet), or a network of networks (such as the Internet). Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, instead of selecting service containers to implement a service path, the service classifier of some embodiments selects service virtual machines to implement the service path. Thus, one of ordinary skill in the art would understand that the invention is not to be limited by the foregoing illustrative details, but rather is to be defined by the appended claims.

The invention claimed is:

1. A method of performing services on data messages, the method comprising:
    at a first host that executes a plurality of service machines for performing services:
        receiving a first data message;
        based on a set of attributes of the first data message, performing a first service classification operation to identify a first set of services to perform on the data message;
        based on an identifier for the first set of services, determining that a set of service machines executing on a second host has to perform the first set of services on the first data message; and
        forwarding the first data message to the second host in order to perform a second service classification operation to identify the set of service machines on the second host to perform the first set of services on the first data message.

2. The method of claim 1 further comprising:
    at the first host:
        receiving a second data message;
        based on a set of attributes of the second data message, performing a third service classification operation to identify a second set of services to perform on the second data message;
        based on an identifier for the second set of services, determining that a set of service machines executing on the first host has to perform the second set of services on the second data message; and
        sequentially forwarding the second data message to each service machine in the set of service machines on the first host that has to perform a service in the second set of services on the second data message.

3. The method of claim 2, wherein forwarding the first data message comprises using MAC redirect to forward the first data message to the second host.

4. The method of claim 3, wherein sequentially forwarding the second data message comprises using MAC redirect to forward the second data message to the different service machines on the first host.

5. The method of claim 2, wherein a front end forwarding element forwards the first and second data messages to the first host.

6. The method of claim 5, wherein the front end forwarding element forwards other data messages to the second host and the second host (i) performs service classification to identify other sets of services to perform on the other data messages and (ii) based on identifiers for the other identified sets of services, either has its service machines perform the identified sets of services or forwards the data messages to the first host to have its service machines perform the identified sets of services.

7. The method of claim 1, wherein performing the first classification operation comprises:
comparing the set of attributes of the first data message with a set of match criteria of one or more service chain specifying rules to identify a service-chain specifying rule with a set of match criteria that matches the attribute set; and
upon identifying a matching service-chain specifying rule, using a service chain identifier specified by the matching rule to identify the first set of services to perform on the first data message.

8. The method of claim 7 further comprising obtaining the service-chain specifying rules from a set of one or more servers along with a definition for service chains specified by the service-chain specifying rules.

9. The method of claim 8, wherein
each service chain is defined by reference to a list of services that are to be performed in a particular order; and
for each of a plurality of services that are in at least one service list, at least two service machines execute on the second host to perform the service.

10. The method of claim 8 further comprising obtaining a network address of the second host from the server set, in order to use to forward data messages to the second host.

11. The method of claim 1, wherein the identifier is a service chain identifier, the method further comprising generating a hash value from the service chain identifier and associating the generated hash value with an identifier for the second host in a lookup table to determine that the set of service machines on the second host machine has to process the first data message.

12. The method of claim 11, wherein generating the hash value comprises generating the hash value further from a source network address of the first data message.

13. The method of claim 1, wherein the identifier is a service path identifier, the method further comprising generating a hash value from the service path identifier and associating the generated hash value with an identifier for the second host in a lookup table to determine that the set of service machines on the second host machine has to process the first data message.

14. The method of claim 1, wherein the machines comprise containers.

15. The method of claim 14, wherein first and second hosts execute a Linux operating system and the classification and forwarding operations are processes defined as hooks in the network interface ports of the Linux operating system.

16. A non-transitory machine readable medium storing a program for execution by a set of processing units of a first host computer that executes a plurality of service machines for performing services on data messages, the non-transitory machine readable medium comprising:
receiving a first data message;
based on a set of attributes of the first data message, performing a first service classification operation to identify a first set of services to perform on the data message;
based on an identifier for the first set of services, determining that a set of service machines executing on a second host has to perform the first set of services on the first data message; and
forwarding the first data message to the second host in order to perform a second service classification operation to identify the set of service machines on the second host to perform the first set of services on the first data message.

17. The non-transitory machine readable medium of claim 16, wherein the program further comprises sets of instructions for:
receiving a second data message;
based on a set of attributes of the second data message, performing a third service classification operation to identify a second set of services to perform on the second data message;
based on an identifier for the second set of services, determining that a set of service machines executing on the first host has to perform the second set of services on the second data message; and
forwarding the second data message to each service machine in the set of service machines on the first host that has to perform a service in the second set of services on the second data message.

18. The non-transitory machine readable medium of claim 17, wherein the set of instructions for forwarding the first data message comprises a set of instructions for using MAC redirect to forward the first data message to the second host.

19. The non-transitory machine readable medium of claim 18, wherein the set of instructions for forwarding the second data message comprises a set of instructions for using MAC redirect to forward the second data message to the different service machines on the first host.

20. The non-transitory machine readable medium of claim 17, wherein a front end forwarding element forwards the first and second data messages to the first host.

* * * * *